United States Patent Office 3,290,123
Patented Dec. 6, 1966

3,290,123
METHOD FOR PREPARING SODIUM ALUMINUM HYDRIDE
Frank P. Del Giudice, Beverly, and Robert C. Wade, Ipswich, Mass., assignors to Metal Hydrides Incorporated, Beverly, Mass., a company of Massachusetts
No Drawing. Filed Apr. 6, 1960, Ser. No. 20,248
5 Claims. (Cl. 23—365)

This invention relates to a method for preparing metal aluminum hydrides having the formula $M(AlH_4)_x$ where M is a metal selected from alkali metals and alkaline earth metals and $x$ is the valence of the metal. More particularly, the invention relates to a method for preparing sodium aluminum hydride.

The patent to H. I. Schlesinger and A. E. Finholt, No. 2,567,972, dated September 18, 1951, describes a method for preparing a metal aluminum hydride having the above formula. This method comprises reacting a hydride of an alkali metal or alkaline earth metal with an aluminum halide in an ether reaction medium. The reaction is illustrated by the equation:

$$4LiH + AlCl_3 \rightarrow LiAlH_4 + 3LiCl$$

Lithium aluminum hydride of high purity has been perpared in high yield commercially for several years by this method. However, the method has not been found satisfactory for the perparation of sodium aluminum hydride and other metal aluminum hydrides.

We have discovered a method whereby sodium aluminum hydride and other alkali metal or alkaline earth metal aluminum hydrides having the formula $M(AlH_4)_x$ can be synthesized directly from the elements. In accordance with the method of the present invention an alkali metal, such as sodium, potassium or lithium, or an alkaline earth metal, such as calcium or magnesium, or the hydride of an alkali or alkaline earth metal, is heated at an elevated temperature in a confined reaction zone with a finely divided aluminum alloy in an inert liquid carrier in the presence of hydrogen under superatmospheric pressure while agitating the mixture until reaction between the aluminum, hydrogen and the alkali metal or alkaline earth metal or hydride thereof is complete. We have found a temperature between about 100° C. and 200° C. and a hydrogen pressure between about 2500 and 5000 pounds per square inch to be suitable. A higher pressure may be used but is not necessary. The metal with which the aluminum is alloyed appears to act as a reaction promoter.

Suitable alloys for use in the practice of the invention are, for example, alloys of aluminum with a small amount, such as from about 0.1 to 25 percent by weight or more based upon the weight of alkali metal or alkaline earth metal in the reaction mixture, of calcium, lithium, nickel, magnesium, lead or mercury. When the alloy used is an alloy of aluminum with a metal which normally forms a hydride by direct action with hydrogen, a small amount of such metal aluminum hydride may be present in the final product. Suitable inert liquid carriers are saturated liquid hydrocarbons, such as hexane, octane, ligroin and cyclohexane; the lower alkyl ethers, such as dimethyl ether, diethyl ether, diisopropyl ether and dibutyl ether; and ethers, such as tetrahydrofuran, dioxane or the dimethyl ether of ethylene glycol.

The invention is illustrated further by the following specific example.

8.6 grams of 30 mesh calcium aluminum alloy containing about 5–8 percent of calcium, 6.8 grams of sodium metal and 125 ml. of tetrahydrofuran were charged into a 250 ml. Magne-Dash reactor fitted with a magnetic agitator and suitable heating means. Hydrogen was introduced into the reactor under a pressure of about 3000 p.s.i. The reaction mixture then was heated for 16 hours at a temperature of about 175° C. with continuous agitation. 10.9 grams of sodium aluminum hydride containing less than 0.1 percent calcium as calcium aluminum hydride was isolated from the reaction mixture representing a yield of 68 percent, the purity being 99 percent.

We claim:
1. The method for preparing sodium aluminum hydride which comprises heating in a confined reaction zone a material selected from the group consisting of sodium metal and sodium hydride with a finely divided alloy of aluminum with another metal selected from the group consisting of nickel and lead in an inert liquid carrier at a temperature between 100° C. and 200° C. in the presence of hydrogen under a pressure between 2500 and 5000 p.s.i. while agitating the mixture until reaction between said selected material, aluminum and hydrogen is substantially complete, said alloy of aluminum containing an amount of said other selected metal from about 0.1 to 25 percent by weight based upon the weight of said selected material used.
2. The method as claimed by claim 1 wherein said selected material is sodium metal.
3. The method as claimed by claim 1 wherein said selected material is sodium hydride.
4. The method as claimed by claim 2 wherein said alloy is an alloy of aluminum and nickel.
5. The method as claimed by claim 2 wherein said alloy is an alloy of aluminum and lead.

References Cited by the Examiner

UNITED STATES PATENTS

| | | | |
|---|---|---|---|
| 1,094,194 | 4/1914 | Bosch et al. | 23—199 |
| 2,034,077 | 3/1936 | Arnold et al. | 252—475 |
| 2,271,956 | 2/1942 | Ruthruff | 260—448 |
| 2,372,671 | 4/1945 | Hansley | 23—204 |
| 2,729,540 | 1/1956 | Fisher | 23—14 |
| 2,865,706 | 12/1958 | Fitch et al. | 23—14 |
| 2,900,402 | 8/1959 | Johnson | 23—204 |
| 2,920,935 | 1/1960 | Finholt | 23—14 |
| 2,992,248 | 7/1961 | Pearson | 23—14 X |
| 3,100,786 | 8/1963 | Fernald | 260—448 |

FOREIGN PATENTS 857,680   1/1961   Great Britain.

OTHER REFERENCES

Derwent Belgian Patent Report No. 58 B, Nov. 16, 1959, pages C13 and C14.

OSCAR R. VERTIZ, *Primary Examiner.*

MAURICE A. BRINDISI, GEORGE D. MITCHELL,
*Examiners.*

M. N. MELLER, M. WEISSMAN, *Assistant Examiners.*